United States Patent Office 2,941,736
Patented June 21, 1960

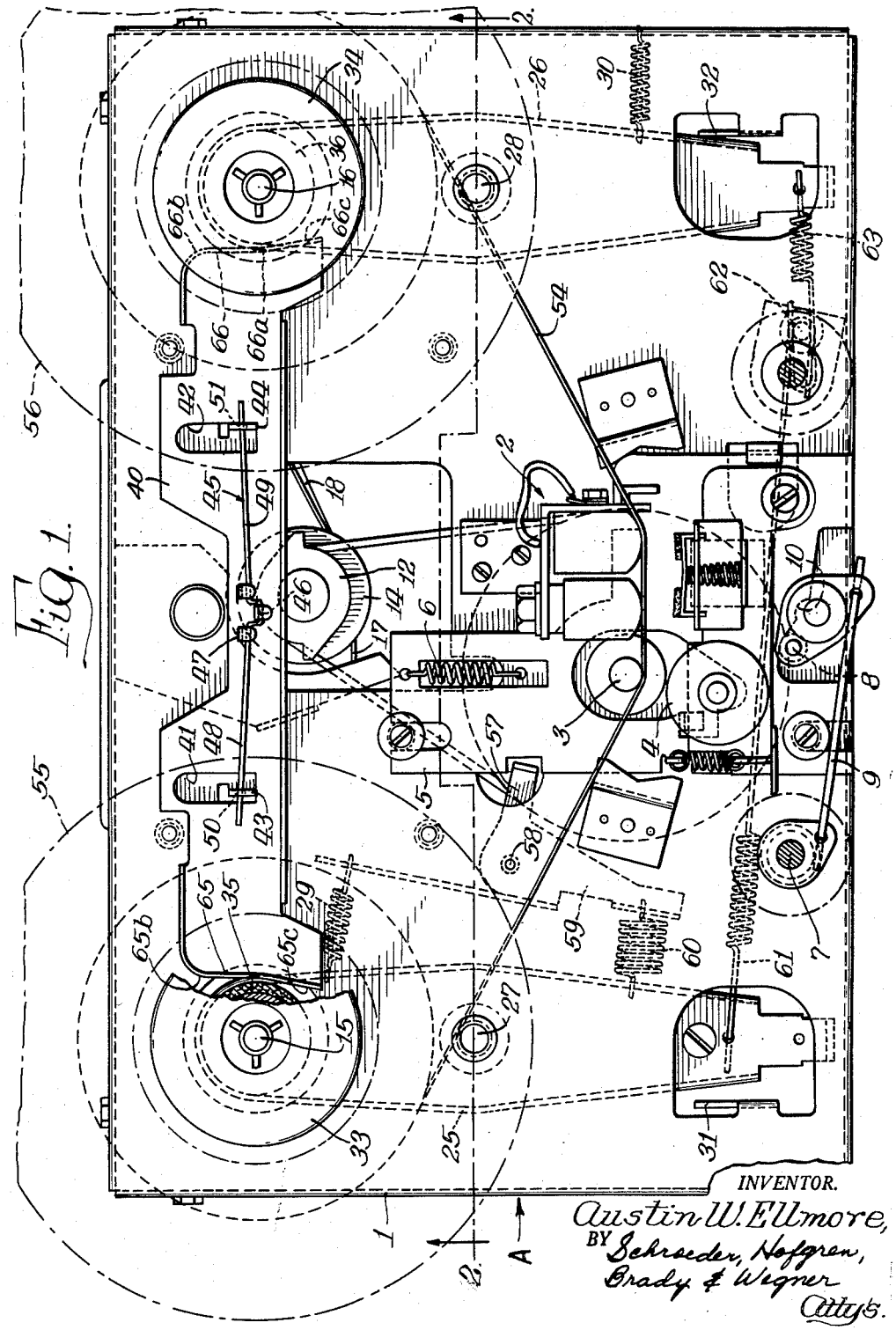

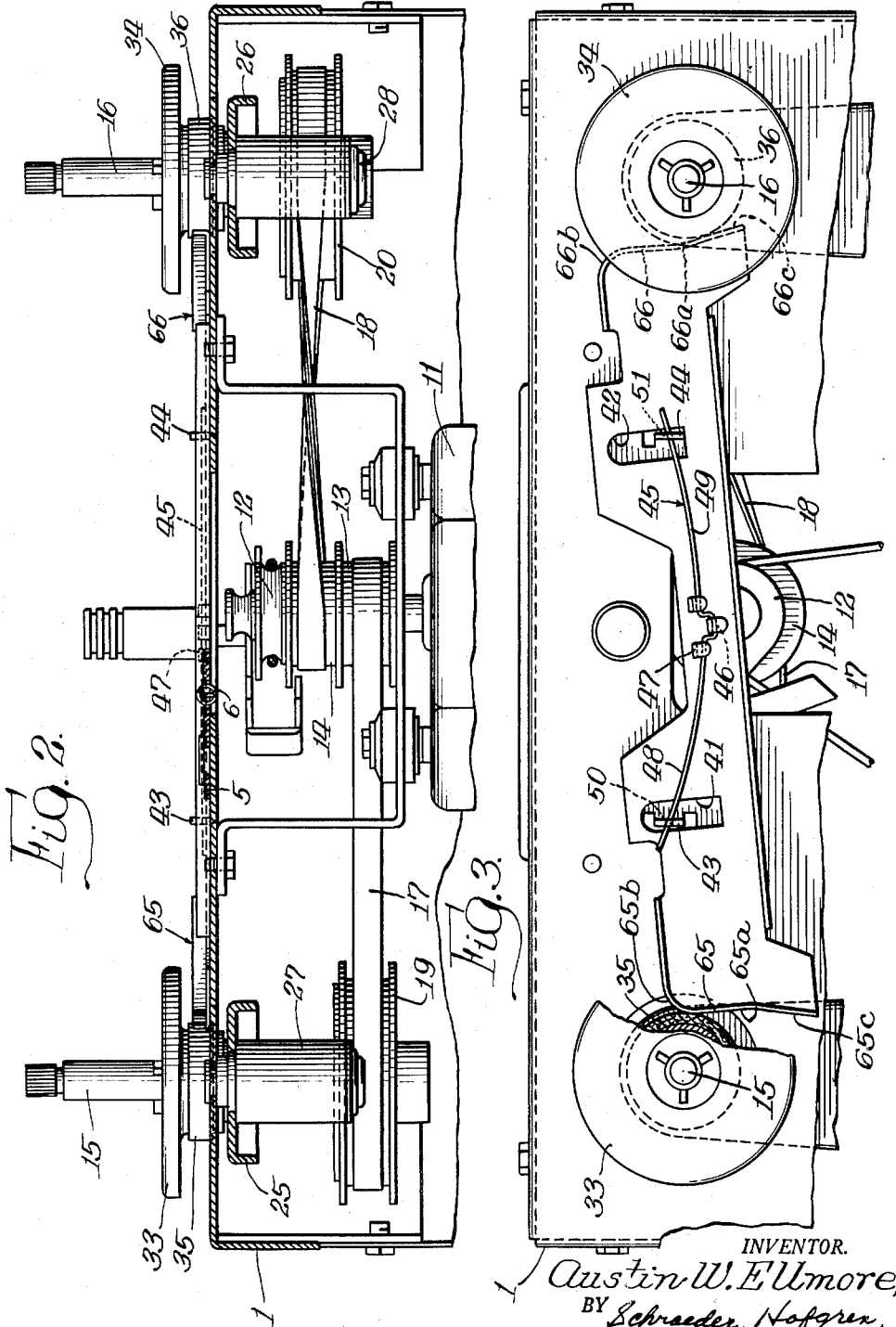

2,941,736

TAPE RECORDER BRAKE MECHANISM

Austin W. Ellmore, Menlo Park, Calif., assignor to Warwick Manufacturing Corporation, a corporation of Delaware Filed Aug. 30, 1956, Ser. No. 607,116

8 Claims. (Cl. 242—55.12)

This invention relates to a tape recorder and more particularly to a tape recorder brake mechanism operable in response to discontinuance of the reel holder drive.

An object of this invention is to provide a brake mechanism for a tape recorder having feed and take-up reel spindles in which a brake mechanism is responsive to discontinuance of the spindle drive to brake both of said spindles.

A further object of this invention is to provide a brake mechanism for a tape recorder having a base and laterally spaced spindles movably mounted on the base, a brake plate mounted on the base and extending between the spindles with brake surfaces at opposite ends selectively engageable with said spindles, and means for moving the brake plate to a non-braking position when the take-up spindle is moved to increase its distance from the feed spindle, said brake plate moving to a braking position when the take-up spindle is moved to a position a minimum distance from the feed spindle and into engagement with the brake plate.

An additional object of the invention is to provide a tape recorder having a base, a pair of spindles spaced transversely of the base, a friction collar associated with each spindle, a pair of arms pivotally mounted on the base for each mounting one of said spindles for movement toward and away from each other, spring means engageable with the arms for urging the spindles toward each other to a minimum distance, a brake plate mounted between the spindles for movements back and forth and transversely of the base and having brake surfaces at opposite ends engageable with the friction collars when the spindles are a minimum distance apart and also when the brake plate is in a canted braking position having a maximum effective length, a brake plate spring for yieldably urging the brake plate to a rearward, non-canted position in which it has a minimum effective length with respect to the spindles, and means for moving either arm to increase the distance between the spindles whereby the brake plate spring moves the brake plate to said non-canted position and the friction collar on the moved arm disengages from its adjacent brake surface, said other friction collar engaging the other brake surface to shift the brake plate transversely of the base and free said other friction collar and brake surface, rotation of the friction collars on the brake plate moving the brake plate to canted braking position when the moved arm is returned to its minimum distance position.

The objects of the invention generally set forth, together with other ancillary advantages, are attained by the construction and arrangement shown by way of illustration in the accompanying drawing, in which:

Fig. 1 is a plan view of a tape recorder drive mechanism with parts broken away and the parts positioned for moving a tape in a fast wind operation;

Fig. 2 is a vertical section taken along the line 2—2 in Fig. 1; and

Fig. 3 is a fragmentary plan view of the mechanism shown in Fig. 1 with the parts positioned in braked relation and parts broken away.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

As shown in the drawings, a tape recorder, indicated generally at A, includes a base 1 having a head assembly, shown diagrammatically at 2, and a feed coupling including drive shaft 3 and pressure roller 4. The pressure roller 4 is carried on a plate 5 slidably mounted on the base which is spring urged toward the front of the base by a spring 6. The feed coupling between shaft 3 and pressure roller 4 may be made by operating a shaft 7 which operates a cam pin 8 by a link 9 to place the cam pin in a notch 10 in plate 5.

A drive motor 11 drives a shaft having pulley 12 for driving the drive shaft 3. Pulleys 13 and 14 are provided for driving transversely spaced spindles 15 and 16 in opposite directions by belts 17 and 18 which engage spindle pulleys 19 and 20, respectively. The belts 17 and 18 may readily slip on their respective spindle pulleys 19 and 20 when in a somewhat slack condition as provided when there is no tape drive and also may slip when in taut driving relation with their spindle pulleys when tending to move the spindles at a rate of speed greater than that permitted by the tape as fed by the feed coupling. One form of drive belt suitable for use is made of woven rayon material.

The spindles 15 and 16 are supported by arms 25 and 26 pivotally mounted on pins 27 and 28, respectively, extending downwardly from the base so as to provide for movement of the spindles toward and away from each other in suitable openings formed in the base 1.

The arms 25 and 26 are urged in a direction to maintain a minimum distance between spindles 15 and 16 by springs 29 and 30, respectively, and their movement is limited by stops 31 and 32 formed on the base. Each of the spindles is adapted to carry a reel holder, as shown at 33 and 34, and a friction collar 35, 36 is formed on each reel holder. The friction collars may be formed of neoprene impregnated cork.

A brake plate 40 extends transversely of the base between the spindles 15 and 16 and has means defining openings or cut-outs 41 and 42 which are of a size to receive stop ears 43 and 44 struck up from the base 1 and to permit movement of the brake plate both back and forth and transversely of the base. These movements combine to permit movement of the brake plate between the neutral position of Fig. 1 and the two canted positions, one of which is shown in Fig. 3.

A wire spring 45 has its bent mid-section 46 engaged under tabs 47 formed on the brake plate and opposite ends 48 and 49 of the spring slidably extend through openings 50 and 51 in the ears 43 and 44 to urge the brake plate rearwardly. The spring 45 tends to maintain the brake plate in a non-canted neutral position, as shown in Fig. 1. This condition exists whenever a tape 54 is being moved between a pair of reels 55 and 56 on spindles 15 and 16 in either direction.

When moving the tape in one direction, as in recording, the spindle 15 and arm 25 are moved counterclockwise to engage the friction drive by the belt 17. This movement is accomplished by engagement of plate 5 with a bell-crank 57, pivoted at 58, which has an arm 59 connected to arm 25 by a spring 60. This same movement for a fast wind operation may be effected by a spring link 61 connected between arm 25 and a button 62. The arm 26 and spindle 16 may be moved clockwise to move the tape in the other direction by rotation of the button 62 in a direction to pull spring link 63 which is connected to arm 26.

As shown in Fig. 3, the brake plate 40 is in its final canted braking position. The brake plate 40 has somewhat concave centrally recessed end faces 65 and 66 at opposite ends formed by turned over flanges forming brake surfaces. The sections 65a and 66a of these end faces are adjacent the friction collars 35 and 36 when the brake plate is in neutral position, as shown in Fig. 1, and somewhat outwardly diverging sections 65b, 66b, 65c, and 66c of the end faces engage the friction collars when the brake plate is in a canted braking position. As shown in Fig. 3, when the brake plate is in final braking position, the friction collars are engaged by brake surfaces 65b and 66c. If the spindles had been rotating in the opposite direction, the brake plate would be canted in the opposite direction and engagement of the friction collars would be by brake surfaces 65c and 66b. The movement of brake plate from neutral to canted braking position occurs in response to rolling movement of the friction collars on the end faces 65 and 66 of the brake plate. The ends of brake surfaces 65b and 66b may be rounded off to obtain a smooth braking action and prevent chatter.

The distance between brake surfaces 65b and 66c and also between brake surfaces 65c and 66b is greater than the distance between the sections 65a and 66a of the brake plate. Thus, the brake plate 40 when canted is of a greater effective length because of the increased distance between the brake surfaces 65b, 65c, 66b, and 66c as compared to the brake plate when in neutral position with sections 65a and 66a of the brake plate end faces opposite the friction collars.

In operation, with the spindles 15 and 16 held in braked relation by the brake plate 40 in canted position, as shown in Fig. 3, the button 7 may be operated to shift plate 5 toward the rear of the base to engage the feed coupling 3, 4 and move spindle 15 outwardly through bell-crank 57 and spring 60 to make the drive belt 17 taut to drive spindle 15. This also increases the distance between spindles 15 and 16 so as to free the brake plate and render the brake plate spring 45 operative to move the brake plate to the neutral position, as shown in Fig. 1. The brake plate is also shifted somewhat to the left to avoid continuing contact between the friction collar 36 and brake surface 66 of the brake plate by initial rotation of the friction collar 36. When it is desired to discontinue movement of the tape, the button 7 is operated in the opposite direction which permits spring 29 to become effective to move spindle supporting arm 25 against its stop 31 and to move the spindle 15 toward spindle 16. This decreases the distance between the spindles and brings friction collar 35 associated with spindle 15 into friction engagement with end face 65 of brake plate 40. With the spindle 15 rotating clockwise, as shown in Fig. 1, this will cause the friction collar 35 to swing brake plate 40 so as to engage brake surface 66 of brake plate 40 with the other friction collar 36. The collar 36 rides along brake surface 66c to shift the brake plate further and engages brake plate opening 42 with stop ear 44. The spindle will move outwardly only to the extent permitted by drive belt 18 so as to cause a jammed condition which brakes collar 36. The friction collar 35 on spindle 15 is held against brake surface 65b by spring 29 to effectively brake spindle 15. This operation results in flexing the brake plate spring 45, as shown in Fig. 3. The inward movement of the spindle 15 slacks off the drive belt 17 so as to discontinue the drive to the spindle 15.

Operation of the button 62 in one direction will cause the same operation as described above through movement of spring link 61 without causing engagement of the feed coupling 3, 4. Operation of the button 62 in the other direction will cause movement of the spindle 16 and the subsequent operations will be similar to those described in connection with spindle 15. Return of the button 62 to neutral position permits the spring 30 to become effective to move the spindle 16 inwardly and rotation of the spindle 16 counterclockwise, as shown in Fig. 1, will cause friction collar 36 to cant the broken plate and engage brake surface 65c with friction collar 35. Rotation of friction collar 35 counterclockwise will jam the brake plate opening 41 against stop ear 43 and the outward movement of spindle 15 will be limited by drive belt 17 to maintain the jammed condition and brake the spindle. The friction collar 36 on spindle 16 is held against brake surface 66b by spring 30 to effectively brake spindle 16.

I claim:

1. A tape recorder having a base supporting a drive motor for driving a pair of axially spaced drive pulleys, a pair of spindles spaced transversely of the base, a pair of belts associated one with each of said drive pulleys and spindles for selectively rotating one or the other of the spindles when functioning as a take-up spindle, a reel holder associated with each spindle having a friction collar, a pair of arms pivotally mounted on the base, each one of said arms mounting one of said spindles for movement toward and away from each other, spring means engageable with the arms for urging the spindles toward each other, means for maintaining a minimum distance between the spindles, a brake plate mounted between the spindles for movements back and forth and transversely of the base and having centrally recessed brake surfaces at opposite ends engageable with the friction collars when the spindles are a minimum distance apart and also when the brake plate is in a canted position having a maximum effective length and braking action, said brake surfaces each having one of their ends rounded off, a brake plate spring for yieldably holding the brake plate in a rearward, non-canted position having a minium effective length, and means for moving either arm to increase the distance between the spindles whereby the brake plate spring moves the brake plate to said non-canted position and the friction collar operatively associated with the moved arm disengages from its adjacent brake surface, said other friction collar engaging the other brake surface to shift the brake plate transversely of the base and free the friction collar from the other brake surface, return of the spindles to a minimum distance apart causing rolling engagement of the friction collars on the brake surfaces to cant the brake plate with said spring means holding one friction collar against a rounded off end of one brake surface and one of said belts holding the other friction collar against its associated brake surface.

2. A tape recorder having a base, a pair of spindles spaced transversely of the base and reversibly rotatable together so as to have one a take-up spindle and the other a feed spindle, each spindle having a friction collar thereon, a pair of arms pivotally mounted on the base, each one of said arms mounting one of said spindles for movement toward and away from each other, a brake plate mounted between the spindles for movements back and forth and transversely of the base and having centrally recessed brake surfaces at opposite ends engageable with the friction collars when the spindles are a minimum distance apart and also when the brake plate is in a braking position having a maximum effective length and braking force, means for yieldably holding the brake plate in a neutral position in which said brake plate has a minimum effective length means, for rotating the spindles, and means for moving either arm to increase the distance between the spindles whereby the yieldable means moves the brake plate to said neutral position, return of the rotating spindles to a minimum distance apart causing rolling engagement of the friction collars with the brake surfaces to move the brake plate to a braking position with outwardly diverging parts of said brake surfaces in engagement with the friction collars.

3. A tape recorder having a base, a pair of spindles spaced transversely of the base, means for mounting at least one of the spindles for movement toward and away from the other spindle, a brake member mounted between the spindles for movements back and forth and transversely of the base and having brake surfaces at opposite ends engageable with the spindles when the brake member is in a brake position, a brake spring for yieldably urging the brake member to a neutral position, and means for moving the movable spindle to increase the distance between the spindles and free the brake member for movement whereby the brake spring moves the brake member from the brake position to said neutral position to free the spindles for rotation.

4. A brake mechanism for a tape recorder having a base, a pair of rotatable spindles spaced transversely of the base and mounted for movement toward and away from each other, means for driving the spindles, and means for moving either spindle to increase the distance between the spindles, comprising, a friction collar on each spindle and rotatable therewith, a brake plate movably mounted on the base and having brake surfaces at opposite ends of the brake plate in engagement with said friction collars when the spindles are a minimum distance apart and the brake plate is in a non-canted position and also when the brake plate is in a canted position, said brake plate in the non-canted position having the brake surfaces out of engagement with the friction collars when the collars are spaced an increased distance apart, and means for moving said brake plate to its non-canted position when one of said spindles is moved to increase the distance between said spindles, said brake plate being moved to its canted position by engagement of the rotating friction collars with said brake surfaces when said one spindle is returned to its initial position.

5. A brake mechanism for a tape recorder having a base, a pair of rotatable spindles spaced transversely of the base and mounted for relative movement toward and away from each other, means for moving one of said spindles from an initial position to increase the distance between the spindles, and means for rotating said one spindle, comprising, a brake with spaced brake surfaces movably mounted on the base and having a braking position wherein the brake surfaces are in engagement with said spindles, said brake having a neutral position wherein the brake surfaces are out of engagement with the spindles when the spindles are an increased distance apart, and means for moving said brake to its neutral position when one of said spindles is moved to increase the distance between said spindles, said brake being moved to its braking position by engagement of the rotating spindles with said brake surfaces responsive to return of said one spindle to its initial position.

6. A brake mechanism for use in a tape recorder having a base and a pair of spindles with friction means thereon, means for driving one of said spindles, spring means urging the spindles toward each other, comprising an elongated brake plate extending between the spindles and having brake surfaces, a pair of stop ears spaced apart transversely of the base each having an opening, cut-outs in the brake plate for receiving the ears and of a size sufficient to permit movement of the plate relative to the ears, a wire spring having a mid-section secured to the brake plate and straight lengths extending oppositely from the mid-section slidably mounted in said ear openings yieldably urging the brake plate to a neutral position with the brake surfaces on the brake plate out of engagement with the friction means, said brake surfaces being centrally recessed to increase the effective length of the brake plate when moved to a canted braking position and engagement of said friction means rotating in opposite directions with said brake surfaces causing the brake plate to move against the action of the wire spring to a braking position wherein one friction collar is jammed against a brake surface and the adjacent cut-out is jammed against its stop ear and the other friction collar is held against its brake surface by said spring means.

7. A brake mechanism for use in a tape recorder having a base and a pair of rotatable spindles with friction means thereon mounted for relative movement on the base, comprising an elongated brake member extending between the spindles and movably mounted on the base and having brake surfaces, a spring connected to the brake member yieldably urging the brake member to a neutral position with the brake surfaces on the brake member out of engagement with the friction means when the spindles are one distance apart, said brake surfaces being curved to increase the effective length of the brake member when moved to an angled position with respect to the neutral position and engagement of said friction means rotating in opposite directions with said brake surfaces when the spindles are a lesser distance apart causing the brake member to move against the action of the spring to said angled position.

8. A brake mechanism for use in a tape recorder having a base and a pair of rotatable spindles with friction means thereon mounted for relative movement on the base, comprising a brake member having brake surfaces, means movably mounting the brake member on the base, means yieldably urging the brake member to a non-braking position with the brake surfaces on the brake member out of engagement with the friction means when the spindles are spaced a certain distance apart, said brake surfaces having outwardly diverging ends to increase the effective length of the brake member when moved to braking position at an angle with respect to the neutral position and engagement of said friction means rotating in opposite directions with said brake surfaces causing the brake member to move against the action of the yieldable urging means to a braking position when the spindles are moved to a lesser distance apart.

References Cited in the file of this patent

UNITED STATES PATENTS

| | | |
|---|---|---|
| 1,629,029 | Garbutt | May 17, 1927 |
| 1,955,764 | Saltzman | Apr. 24, 1934 |
| 2,500,903 | Neff | Mar. 14, 1950 |
| 2,665,855 | Stone | Jan. 12, 1954 |
| 2,687,259 | Owens | Aug. 24, 1954 |